US009203591B2

(12) United States Patent
Koo et al.

(10) Patent No.: US 9,203,591 B2
(45) Date of Patent: Dec. 1, 2015

(54) APPARATUS AND METHOD FOR PERFORMING INTER-CELL INTERFERENCE COORDINATION IN A WIRELESS COMMUNICATION SYSTEM

(75) Inventors: Ja Ho Koo, Anyang-si (KR); Jin Young Chun, Anyang-si (KR); Ji Won Kang, Anyang-si (KR); Su Nam Kim, Anyang-si (KR); Bin Chul Ihm, Anyang-si (KR); Sung Ho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 524 days.

(21) Appl. No.: 13/582,962

(22) PCT Filed: Mar. 4, 2011

(86) PCT No.: PCT/KR2011/001515
§ 371 (c)(1),
(2), (4) Date: Sep. 5, 2012

(87) PCT Pub. No.: WO2011/108889
PCT Pub. Date: Sep. 9, 2011

(65) Prior Publication Data
US 2012/0329498 A1   Dec. 27, 2012

Related U.S. Application Data

(60) Provisional application No. 61/310,709, filed on Mar. 5, 2010.

(30) Foreign Application Priority Data

Sep. 9, 2010   (KR) .................... 10-2010-0088509

(51) Int. Cl.
*H04W 72/00* (2009.01)
*H04L 5/00* (2006.01)
(Continued)

(52) U.S. Cl.
CPC ............ *H04L 5/0073* (2013.01); *H04B 17/345* (2015.01); *H04J 11/005* (2013.01); *H04L 5/0058* (2013.01); *H04B 7/024* (2013.01); *H04W 72/0413* (2013.01); *H04W 72/082* (2013.01)

(58) Field of Classification Search
None
See application file for complete search history.

(56) References Cited

U.S. PATENT DOCUMENTS

2009/0137221 A1* 5/2009 Nanda et al. .................. 455/296
2009/0197588 A1* 8/2009 Khandekar et al. ........ 455/422.1
(Continued)

FOREIGN PATENT DOCUMENTS

KR   10-2009-0102459   9/2009

OTHER PUBLICATIONS

NCTU/MediaTek, "Frequency Planning for Inter-Cell Interference Reduction in 3-Cell Collaborative MIMO Systems (15.5.2.3)", IEEE 802.16 Broadband Wireless Access Working Group, IEEE C802.16m-09/2280, Nov. 5, 2009.

*Primary Examiner* — Philip Sobutka
(74) *Attorney, Agent, or Firm* — Lee, Hong, Degerman, Kang & Waimey

(57) ABSTRACT

An apparatus and method for controlling inter-cell interference is disclosed. The user equipment for controlling inter-cell interference in a wireless communication system includes an interference level measuring module configured to measure interference levels of neighboring cells using at least one of information about the number of antennas among antennas deployed in the neighboring cells, information about indexes of the effective antennas, and information about reference signal of the neighboring cells, an interference restriction request determination module configured to compare the interference levels of the neighboring cells with a predetermined threshold and to determine whether or not UE requests an interference restriction to the neighboring cells, and a transmitter configured to transmit information about one or more neighboring cells, to which the interference restriction request will be transmitted, to a serving base station.

14 Claims, 13 Drawing Sheets

(51) Int. Cl.
*H04J 11/00* (2006.01)
*H04B 17/345* (2015.01)
*H04B 7/02* (2006.01)
*H04W 72/04* (2009.01)
*H04W 72/08* (2009.01)

(56) References Cited

U.S. PATENT DOCUMENTS

2010/0035600 A1 2/2010 Hou et al.
2010/0040006 A1 2/2010 Caire

* cited by examiner

APPARATUS AND METHOD FOR PERFORMING INTER-CELL INTERFERENCE COORDINATION IN A WIRELESS COMMUNICATION SYSTEM

CROSS-REFERENCE TO RELATED APPLICATIONS

This application is the National Stage filing under 35 U.S.C. 371 of International Application No. PCT/KR2011/001515, filed on Mar. 4, 2011, which claims the benefit of earlier filing date and right of priority to Korean Patent Application No. 10-2010-0088509, filed on Sep. 9, 2010, and also claims the benefit of U.S. Provisional Application Serial No. 61/310,709, filed on Mar. 5, 2010, the contents of which are all hereby incorporated by reference herein in their entirety.

TECHNICAL FIELD

The present invention relates to a wireless communication system, and more particularly, to an apparatus and method for controlling inter-cell interference.

BACKGROUND ART

A Distributed Antenna System (DAS) utilizes a plurality of distributed antennas connected to a single base station in a wired manner or through a dedicated line. The base station includes a plurality of antennas which is distributed and located in a cell for providing a service. The DAS is different from a Centralized Antenna System (CAS), in which a plurality of base station antennas is provided at the center of a cell, in that a plurality of antennas is distributed and located so as to be spaced apart from one another by a predetermined distance in a cell. The CAS is generally a cellular communication system such as a Wideband Code Division Multiple Access (WCDMA), High Speed Packet Access (HSPA), Long Term Evolution (LTE)/Long Term Evolution-Advanced (LTE-A) or 802.16 system, and utilizes various multiple antenna schemes, in which multiple antennas are mounted in a single base station in a cell-based structure, such as an Open Loop-Multi Input Multi Output (MIMO) scheme, a Closed Loop-MIMO scheme or a Multi-BS MIMO scheme.

The DAS is different from a femto cell in that each distributed antenna unit does not directly manage an antenna region thereof, but the base station located at the center of the cell manages all distributed antenna regions located in the cell. In addition, the DAS is different from a multi-hop type relay system or an ad-hoc network, in which a base station and a Relay Node (RN) are wirelessly connected, in that the distributed antenna units are connected in the wired manner or through the dedicated line. In addition, the DAS is different from a repeater structure for amplifying a signal and transmitting the amplified signal in that each distributed antenna can transmit different signals to User Equipments (UE) adjacent to the antenna according to a command of the base station.

Such a DAS may be considered a MIMO system because the distributed antennas simultaneously transmit and receive different data streams so as to support a single UE or multiple UEs. From the viewpoint of the MIMO system, in the DAS, since the antennas are distributed at various positions in the cell, a transmission region of each antenna is reduced compared with the CAS, thereby reducing transmit power. In addition, the transmission distance between the antenna and the UE is reduced so as to reduce path loss and to increase data transfer rate. Therefore, it is possible to increase transmission capacity and power efficiency of a cellular system and to satisfy communication performance with relatively uniform quality regardless of the position of a user in the cell, as compared with the CAS. In addition, since the base station and the plurality of distributed antennas are connected in the wired manner or through the dedicated line, signal loss is low, correlation and interference between antennas are reduced, and a Signal-to-Interference plus Noise Ratio (SINR) is high.

The DAS may be utilized in parallel with the existing CAS or may replace the CAS so as to establish a new cellular communication standard, in order to reduce costs necessary for installing more base stations in a next-generation mobile communication system and costs necessary for maintaining a backhaul network, to enlarge service coverage and to improve SINR.

However, until now, no research has been conducted into an apparatus and method for controlling inter-cell interference in a multi-cell environment, to which the DAS is applied.

DISCLOSURE OF INVENTION

Technical Problem

An object of the present invention devised to solve the problem lies on an user equipment for controlling inter-cell interference.

Another object of the present invention devised to solve the problem lies on a base station for controlling inter-cell interference.

Another object of the present invention devised to solve the problem lies on a method for controlling inter-cell interference by an user equipment.

Another object of the present invention devised to solve the problem lies on a method for controlling inter-cell interference by a base station.

Solution to Problem

The object of the present invention can be achieved by providing a user equipment for controlling inter-cell interference in a wireless communication system in which a plurality of antennas is deployed in each cell, the user equipment including an interference level measuring module configured to measure interference levels of neighboring cells using at least one of information about the number of antennas, information about indexes of the antennas, and information about reference signal of the neighboring cells, an interference restriction request determination module configured to compare the interference levels of the neighboring cells with a predetermined threshold and to determine whether or not the UE requests an interference restriction to the neighboring cells, and a transmitter configured to transmit information about one or more neighboring cells, to which the interference restriction request will be transmitted, to a serving base station.

The user equipment may further include a receiver configured to receive the information about the number of antennas, the information about the indexes of the antennas, and the information about the reference signal of the neighboring cells from the serving base station. The at least one of information is about effective antennas, which cause interference to the user equipment, among antennas deployed in the neighboring cells.

The user equipment may further include an effective antenna determination module configured to determine at least one of the number of effective antennas, which cause interference to the user equipment, among the antennas deployed in the neighboring cells and the indexes of the effective antennas.

In another aspect of the present invention, provided herein is a base station for controlling inter-cell interference in a wireless communication system in which a plurality of antennas is deployed in each cell, the base station including: a receiver configured to receive a message for requesting interference restriction from one or more user equipments or respective serving base stations of one or more user equipments; and a processor configured to turn off previously defined effective antennas which cause interference to the one or more user equipments or specific beam pattern groups which cause interference to the one or more user equipments among beam antenna groups of the effective antennas or restrict the use thereof in a specific time and/or frequency domain.

In another aspect of the present invention, provided herein is a method for controlling inter-cell interference by a user equipment in a wireless communication system in which a plurality of antennas is deployed in each cell, the method including: measuring interference levels of neighboring cells using at least one of information about the number of antennas, information about indexes of the antennas, and information about reference signal of the neighboring cells; comparing the interference levels of the neighboring cells with a predetermined threshold and determining whether or not the UE requests an interference restriction to the neighboring cells; and transmitting information about one or more neighboring cells, to which the interference restriction request will be transmitted, to a serving base station.

The method may further include receiving the information about the number of antennas, the information about the indexes of the antennas, and the information about the reference signal of the neighboring cells from the serving base station. The at least one of information is about effective antennas, which cause interference to the user equipment, among antennas deployed in the neighboring cells.

The method may further include determining at least one of the number of effective antennas, which cause interference to the user equipment, among the antennas deployed in the neighboring cells and the indexes of the effective antennas.

In another aspect of the present invention, provided herein is a method for controlling inter-cell interference by a base station in a wireless communication system in which a plurality of antennas is deployed in each cell, the method including: receiving a message for requesting interference restriction from one or more user equipments or respective serving base stations of one or more user equipments; and turning off previously defined effective antennas which cause interference to the one or more user equipments or specific beam pattern groups which cause interference to the one or more user equipments among beam antenna groups of the effective antennas or restricting the use thereof in a specific time and/or frequency domain.

Advantageous Effects of Invention

In the apparatus and method for controlling inter-cell interference of the present invention, it is possible to remarkably improve communication and throughput by reducing interference experienced by an user equipment located at a cell edge.

In particular, according to the present invention, it is possible to remarkably improve communication performance in a system in which antennas are distributed in each cell.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Hereinafter, the preferred embodiments of the present invention will be described with reference to the accompanying drawings. It is to be understood that the detailed description which will be disclosed with reference to the accompanying drawings is intended to describe the exemplary embodiments of the present invention, and is not intended to describe a unique embodiment through which the present invention can be carried out. Hereinafter, the detailed description includes detailed matters to provide full understanding of the present invention. However, it will be apparent to those skilled in the art that the present invention can be carried out without the detailed matters. For example, the following description will be made on the assumption that a mobile communication system is a 3rd Generation Partnership Project (3GPP) Long Term Evolution (LTE) system, but the present invention is applicable to other mobile communication systems excluding the unique matters of the 3GPP LTE system.

In some instances, well-known structures and devices are omitted in order to avoid obscuring the concepts of the present invention and the important functions of the structures and devices are shown in block diagram form. The same reference numbers will be used throughout the drawings to refer to the same or like parts. The "exemplary" embodiment of the specification does not mean that this embodiment is in any way preferable to other embodiments.

In the following description, it is assumed that a terminal includes a mobile or fixed user end device such as a user equipment (UE), a mobile station (MS) and an Advanced Mobile Station (AMS), and a base station (BS) includes a node of a network end communicating with a terminal, such as a Node-B, an eNode B, eNB, and an Access Point (AP).

In a mobile communication system, a UE may receive information from an eNB in a downlink and transmit information in an uplink. The information transmitted or received by the UE includes data and a variety of control information, and a variety of physical channels is present according to the type and usage of information transmitted or received by the UE. In the present invention, the term "base station (BS)" may also be referred to as a cell or a sector in the regional sense.

Figure 1:
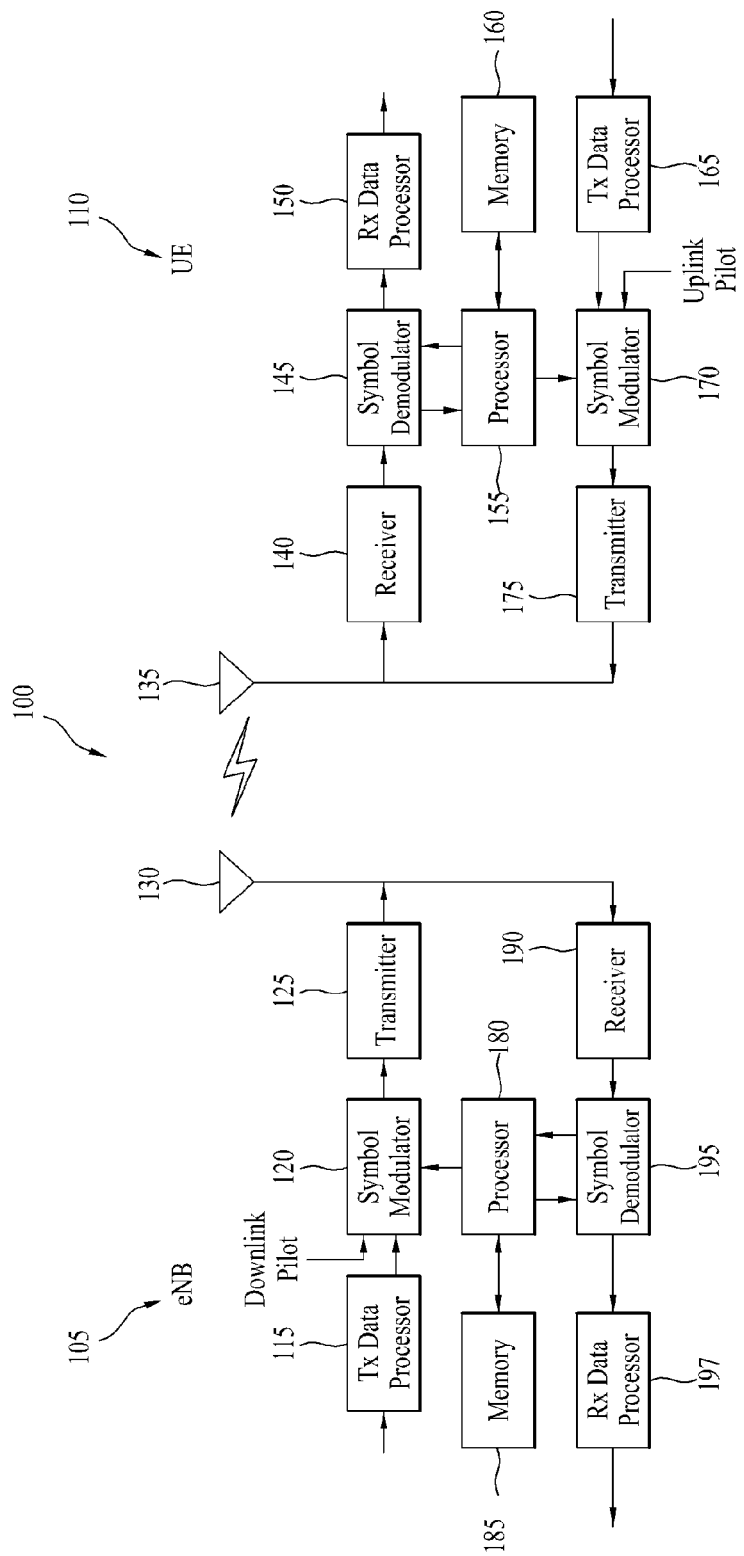
FIG. 1 is a block diagram showing the configurations of a base station (eNB) 105 and a User Equipment (UE) 110 in a wireless communication system according to the present invention.

FIG. 1 is a block diagram showing the configurations of a eNB 105 and a user Equipment (UE) 110 in a wireless communication system according to the present invention.

Although one eNB 105 and one UE 110 are shown in order to simplify the configuration of the wireless communication system 100, one or more base stations and/or one or more UEs may be included.

Referring to FIG. 1, the eNB 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. Although one antenna 130 and one antenna 135 are respectively included in the eNB 105 and the UE 110, each of the eNB 105 and the UE 110 includes a plurality of antennas. Accordingly, the eNB 105 and the UE 110 according to the present invention support a Multiple Input Multiple Output (MIMO) system. The eNB 105 and the UE 110 according to the present invention support both a Single User-MIMO (SU-MIMO) scheme and a Multi User-MIMO (MU-MIMO) scheme.

In downlink, the Tx data processor 115 receives traffic data, formats and codes the received traffic data, interleaves and modulates the coded traffic data (or performs symbol mapping), and provides modulated symbols ("data symbols"). The symbol modulator 120 receives and processes the data symbols and pilot symbols and provides a symbol stream.

The symbol modulator 120 multiplexes data and pilot signals and transmits the multiplexed data to the transmitter 125. At this time, the transmitted symbols may be data symbols, pilot symbols or zero signal values. In each symbol period, the pilot symbols may be consecutively transmitted. The pilot symbols may be Frequency Division Multiplexed (FDM), Orthogonal Frequency Division Multiplexed (OFDM), Time Division Multiplexed (TDM) or Code Division Multiplexed (CDM) symbols.

The transmitter 125 receives and converts the symbol stream into one or more analog signals, additionally adjusts (e.g., amplifies, filters, and frequency-up-converts) the analog signals, and generates a downlink signal suitable for transmission through a radio channel. Subsequently, the downlink signal is transmitted to the UE through the antenna 130.

In the UE 110, the antenna 135 receives the downlink signal from the eNB and provides the received signal to the receiver 140. The receiver 140 adjusts (e.g., filters, amplifies, frequency-down-converts) the received signal and digitizes the adjusted signal so as to acquire samples. The symbol demodulator 145 demodulates the received pilot symbols and provides the demodulated pilot symbols to the processor 155, for channel estimation.

The symbol demodulator 145 receives downlink frequency response estimation values from the processor 155, performs data demodulation with respect to the received data symbols, acquires data symbol estimation values (which are estimation values of the transmitted data symbols), and provides the data symbol estimation values to the Rx data processor 150. The Rx data processor 150 demodulates (that is, symbol-demaps and deinterleaves) the data symbol estimation values, decodes the demodulated values, and restores transmitted traffic data.

The processes performed by the symbol demodulator 145 and the Rx data processor 150 are complementary to the processes performed by the symbol modulator 120 and the Tx data processor 115 of the eNB 105.

In the UE 110, in uplink, the Tx data processor 165 processes the traffic data and provides data symbols. The symbol modulator 170 receives the data symbols, multiplexes the data symbols and pilot symbols, performs modulation with respect to the symbols and provides a symbol stream to the transmitter 175. The transmitter 175 receives and processes the symbol stream, generates an uplink signal, and transmits the uplink signal to the eNB 105 through the antenna 135.

The eNB 105 receives the uplink signal from the UE 110 through the antenna 130 and receiver 190 processes the received uplink signal and acquires samples. Subsequently, the symbol demodulator 195 processes the samples and provides pilot symbols received in the uplink and data symbol estimation values. The Rx data processor 197 processes the data symbol estimation values and restores traffic data transmitted from the UE 110.

The respective processors of the UE 110 and the eNB 105 instruct (e.g., control, adjust, manages, etc.) the respective operations of the UE 110 and the eNB 105. The processors 155 and 180 may be connected to the memories 160 and 185 for storing program codes and data. The memories 160 and 185 may be respectively connected to the processors 155 and 180 so as to store operating systems, applications and general files.

Each of the processors 155 and 180 may also be referred to as a controller, a microcontroller, a microprocessor, a microcomputer, etc.

The processors 155 and 180 may be implemented by hardware, firmware, software, or a combination thereof. If a method for controlling inter-cell interference according to the embodiments of the present invention is implemented by hardware, Application Specific Integrated Circuits (ASICs), Digital Signal Processors (DSPs), Digital Signal Processing Devices (DSPDs), Programmable Logic Devices (PLDs), Field Prorammable Gate Arrays (FPGAs), etc. may be included in the processors 155 and 180.

If the method of controlling inter-cell interference according to the embodiments of the present invention is implemented by firmware or software, the firmware or software may be configured to include modules, procedures, functions, etc. for performing the functions or operations of the present invention. The firmware or software configured to perform the present invention may be included in the processors 155 and 180 or may be stored in the memories 160 and 185 so as to be driven by the processors 155 and 180.

Layers of the radio interface protocol between the UE 110 and the eNB 105 in the wireless communication system (network) may be classified into a first layer (L1), a second layer (L2) and a third layer (L3) based on the three low-level layers of the known Open System Interconnection (OSI) model of a communication system. A physical layer belongs to the first layer and provides an information transport service through a physical channel. A Radio Resource Control (RRC) layer belongs to the third layer and provides control radio resources between the UE and the network. The UE 110 and the eNB 105 exchange RRC messages with each other through a wireless communication network and the RRC layer.

In a 3rd Generation Partnership Project (3GPP) Long Term Evolution (LTE) system, a signal processing procedure for transmitting an uplink signal and a downlink signal will now be described.

Figure 2:
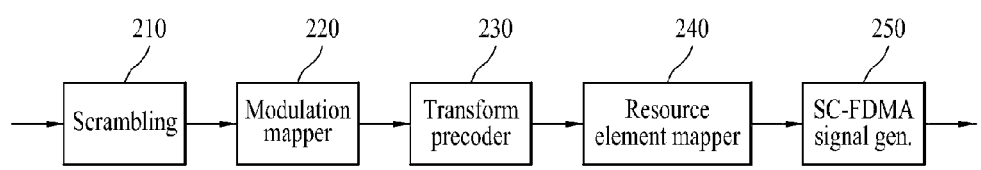
FIG. 2 is a diagram explaining physical channels used in a 3rd Generation Partnership Project (3GPP) Long Term Evolution (LTE) system which is an example of a mobile communication system, and a general signal transmission method using the physical channels.

FIG. 2 is a diagram explaining a procedure of processing a baseband signal representing an uplink physical channel, for uplink signal transmission.

In the UE 110, a scrambling module 210 may scramble a transmitted signal using a specific scrambling signal of the UE 110, for uplink signal transmission. The scrambled signal may be supplied to a modulation mapper 220 so as to be modulated into complex symbols using Binary Phase Shift Keying (BPSK), Quadrature Phase Shift Keying (QPSK) or 16 Quadrature Amplitude Modulation (QAM) according to the type of the transmitted signal and/or a channel state. Thereafter, the modulated complex symbols are processed by a transform precoder 230 and the processed symbols are supplied to a resource element mapper 240. The resource element mapper 240 may map the complex symbols to time-frequency resource elements to be used for actual transmission. The processed signal may be converted into a Radio Frequency (RF) signal through an SC-FDMA signal generator 250 so as to be transmitted to the eNB through the antenna 135.

Figure 3:
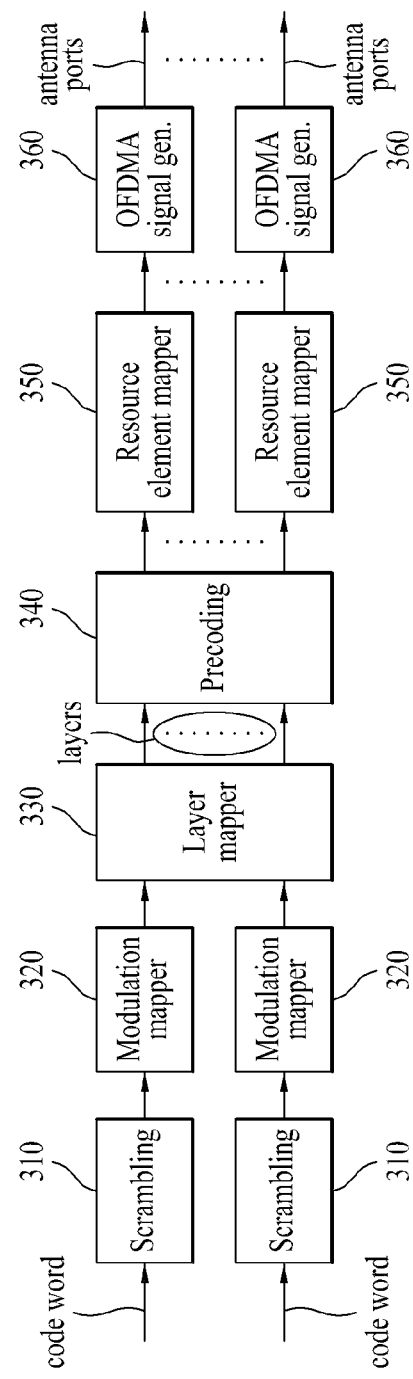
FIG. 3 is a diagram explaining a procedure of processing a baseband signal representing a downlink physical channel by the eNB 105, for downlink signal transmission.

FIG. 3 is a diagram explaining a procedure of processing a baseband signal representing a downlink physical channel by the eNB 105, for downlink signal transmission.

In the 3GPP LTE system, the eNB 105 may transmit one or more codewords in a downlink. Accordingly, one or more codewords may be processed through a scrambling module 310 and a modulation mapper 320 so as to obtain complex symbols, similar to the uplink of FIG. 2. Thereafter, the complex symbols are mapped to a plurality of layers by a layer mapper 330, and each layer is multiplied by a predetermined precoding matrix selected according to the channel state by a precoding module 340 so as to be supplied to a resource element mapper 350. The resource element mapper 350 maps the precoded signals to resource elements and supplies the mapped signals to an OFDM signal generator 360. The OFDM signal generator 360 processes the signals received from the resource element mapper 350 and generates OFDM signals. The OFDM signals may be converted into RF signals so as to be transmitted to the UE 110 through each antenna 130.

In the standard of a mobile communication system, in order to secure high data capacity required in current and future communication protocols, it is necessary to support MIMO transmission even in a Distributed Antenna System (DAS). That is, it is necessary to perform transmission of rank 2 or more for each UE in the same frequency domain and to support MU-MIMO transmission simultaneously supporting several UEs, in a downlink or uplink. Such SU-MIMO communication and MU-MIMO communication are necessarily considered in the IEEE 802 and 3GPP LTE which are the standardization organizations and are actually treated in standards such as IEEE 802.16 and 3GPP LTE Releases 8 and 9. However, since current communication protocols are only designed in consideration of a Centralized Antenna System (CAS) applying evolved technology such as the MIMO technology to the DAS is difficult. Accordingly, there is a need for a communication protocol supporting the DAS, for development of the communication system.

Figure 4:
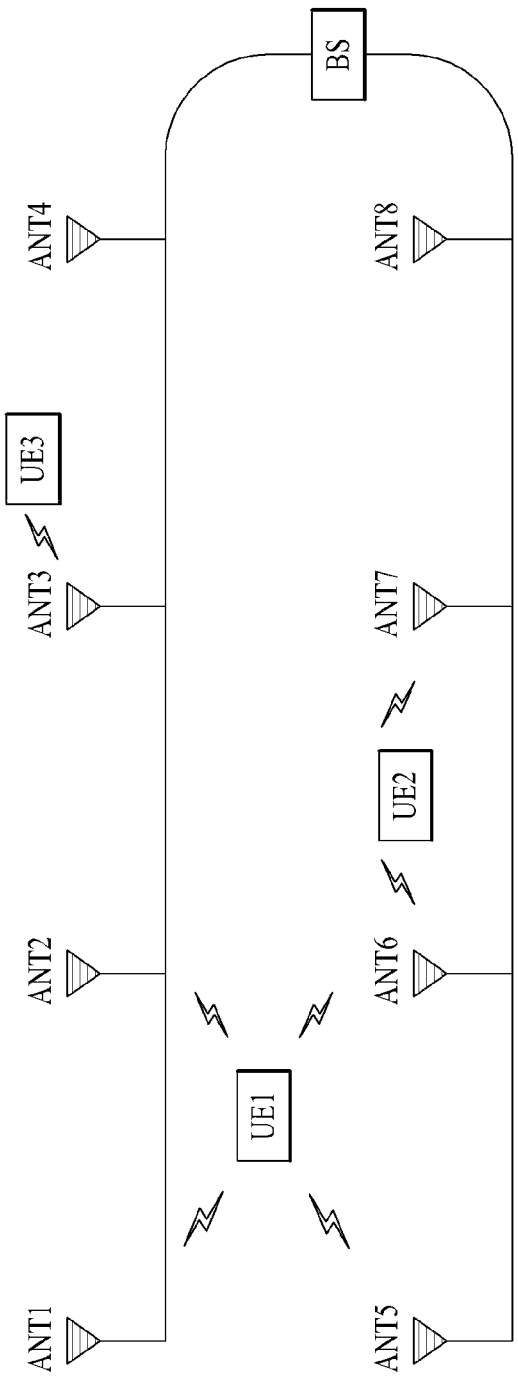
FIG. 4 is a diagram explaining the concept of a Distributed Antenna System (DAS)

FIG. 4 is a diagram explaining the concept of the DAS.

Referring to FIG. 4, the DAS may be variously implemented according to the number and positions of antennas in each cell. In each cell of the DAS, the antennas may be distributed so as to be separated from one another by a predetermined distance or a group of several antennas may be present at each position. In the DAS, if the coverage of the antennas overlap each other, transmission of rank 2 or more is possible, regardless of the distribution form of the antennas. This is a difference between the currently implemented DAS and a DAS to be implemented in the future. In a DAS including a total of eight antennas, three UEs are present and the coverage of each antenna includes parts of neighboring antennas. In this case, the UE 1 may receive signals of antennas 1, 2, 5 and 6, but the signals of antennas 3, 4, 7 and 8 are small enough to be ignored due to path loss. Similarly, the UE 2 may ignore all signals except the signals of the antennas 6 and 7 and the UE 3 may dominantly receive only the signal of the antenna 3.

As shown in FIG. 4, in the DAS, no problem occurs when performing Multi User-MIMO (MU-MIMO) communication with UEs near the cell edge. For example, in the DAS, the antennas 1, 2, 5 and 6 may communicate with the UE 1, the antenna 3 may communicate with the UE3, and the antenna 7 may communicate with the UE 2. The DAS may be managed such that antennas 4 and 8 are used for transmission to UE 2 or UE 3 or are turned off.

In the DAS, during Single User-MIMO (SU-MIMO) and MU-MIMO communication, the number of data streams (layers) of each UE may vary, and an antenna or an antenna group may be allocated to each UE. That is, the DAS may support a specific antenna or antenna group with respect to each UE, and the number of antennas (antenna groups) may frequently change.

Transmission using the cooperative MIMO scheme in the existing CAS is proposed in order to reduce inter-cell interference in a multi-cell environment. If the cooperative MIMO system is used, the UE commonly may receive data from multiple eNBs. In addition, each eNB may simultaneously support one or more UEs using the same frequency resources in order to improve system performance. In addition, the eNB may perform a Space Division Multiple Access (SDMA) method based on information on the channel state between the eNB and the UE.

In the cooperative MIMO system, a serving eNB and one or more cooperative eNBs are connected to a scheduler through a backbone network. The scheduler may operate by receiving the information on the channel state between each UE and each cooperative eNB which is measured by each base station through the backbone network. For example, the scheduler schedules information for the cooperative MIMO operation with respect to the serving eNB and one or more cooperative eNBs. That is, the scheduler directly indicates the cooperative MIMO operation to each eNB.

The DAS refers to a system in which a single eNB manages antennas distributed at various positions in a cell, unlike a CAS in which antennas of an eNB are centralized on the center of a cell. That is, the DAS is a system in which the antennas of the eNB are distributed in the cell. In such a DAS, UEs may select different effective antennas in the cell and receive data from the eNB through the selected effective antennas. In each DAS, since beams are formed by different effective antennas in each cell, the beams formed by the different effective antennas are influenced by interference of a neighboring cell, unlike the CAS.

The existing CAS can improve communication performance of a UE located at a cell edge using a Coordinate Multi Point (CoMP) scheme in a multi-cell environment. In such a CoMP scheme, there are a cooperative MIMO-based Joint Processing (JP) scheme through data sharing and a Coordinate Scheduling/Coordinated Beamforming (CS/CB) scheme for reducing inter-cell interference, such as a worst companion scheme or a best companion scheme.

The worst companion scheme is an interference elimination scheme enabling a UE to report a PMI having highest interference to one or more neighboring cells for performing the CoMP operation so as to enable the cells to utilize PMIs other than the high interference PMI. The best companion scheme is a scheme for enabling a UE to report a PMI with lowest interference to one or more neighboring cells so as to enable the cells to utilize the PMI such that inter-cell interference is reduced. The UE which performs the CoMP operation can improve the communication performance of the UE located at the cell edge by using another adequate CoMP scheme according to situations (e.g., an intra eNB and an inter eNB). However, the PMI report for the best/worst companion increases uplink feedback overhead if the number of neighboring cells that cause interference is increased or a plurality of PMIs is transmitted for more accurate scheduling. In addition, excessive backhaul delay and overhead may be caused due to the increase in the exchange amount of a restricted/ recommended PMI and associated information with the eNB.

Such problems may occur in the CoMP scheme of the DAS as well as the CAS. Accordingly, an interference restriction (e.g., silencing) method for reducing feedback overhead of a UE is proposed. A beam coordination scheme refers to a scheme for enabling a UE to report a restricted or recommended PMI to a serving eNB and transmitting a desirable signal with low interference from the neighboring cells to the UE. In contrast, the silencing scheme, which is an interference restriction scheme, enables a UE, which experiences interference, to restrict power to a predetermined value or less with respect to effective antennas of neighboring cells or beam patterns (e.g., PMIs) used by the neighboring cells or to request the use restriction of the effective antennas so as not to transmit any signal (data and reference signal). The feedback information of the UE may not include information such as PMI, but may include information having a size of 1 bit, which is capable of turning on/off silencing.

In the present invention, the concept of the "effective antenna" for a specific UE needs to be defined. The effective antenna of the serving eNB for the specific UE refers to an antenna for dominantly transmitting a signal to the specific UE, and an effective antenna of a neighboring eNB (or a cell) refers to an antenna which has influence on the specific UE. In the present specification, a cell to which the DAS is applied may be referred to as a "DAS cell".

In order to apply the best/worst companion scheme or silencing scheme based on the PMI or on/off information to the DAS, the UE may require information on neighboring cells. However, in case of cell-specific silencing, the information on the neighboring cells may not be required and this will be described later.

In the existing CAS, since the neighboring cells operate using a fixed antenna configuration, the UE in the serving cell feeds back a PMI based on the fixed antenna configuration using the best/worst companion scheme. In the existing CAS, one or more neighboring cells in a set which performs the CoMP operation include the same number of antennas and a UE knows the antenna configuration information or the serving cell informs the UE of antenna configuration information of one or more neighboring cells in the CoMP set such that the UE can know the antenna configuration information. Unlike the CAS, in the DAS, since the antenna configuration of each cell varies and thus an effective antenna configuration varies, a problem occurs when the UE measures and feeds back interference of neighboring cells. That is, the UE may require information on the number of effective antennas of the neighboring cells, the indexes of the effective antennas, and the pilot patterns of the neighboring cells. The UE may transmit indication information (e.g., 1-bit on/off information) for the PMI or silencing of the neighboring cells which have influence on the UE to the serving eNB (cell) or the neighboring eNB (cell) based on such information.

In the DAS of a single-cell environment, in order to determine effective antennas for the UE 110, the following methods may be used. The receiver 190 of the eNB 105 receives uplink data, a pilot signal, a sounding channel, a feedback channel, an Acknowledgement/Negative Acknowledgement (ACK/NACK), etc. from the UE 105 through the antenna 130. Then, the processor 180 may measure an uplink signal and determine the number and/or the indexes of effective downlink transmission antennas for the UE in the downlink. In contrast, the receiver 140 of the UE 110 may receive a downlink signal through the antenna 135, and the processor 155 may measure the channel state of the received downlink signal and determine the number and/or the indexes of effective downlink transmission antennas. The transmitter 175 may transmit information on the number and/or the indexes of effective antennas to the eNB 105 through the antenna 135. The eNB 105 may appropriately change the fed-back number and/or the indexes of effective downlink transmission antennas according to network load and the like.

Hereinafter, a method of enabling a UE to control inter-cell interference in a multi-cell DAS will be described.

Figure 5:
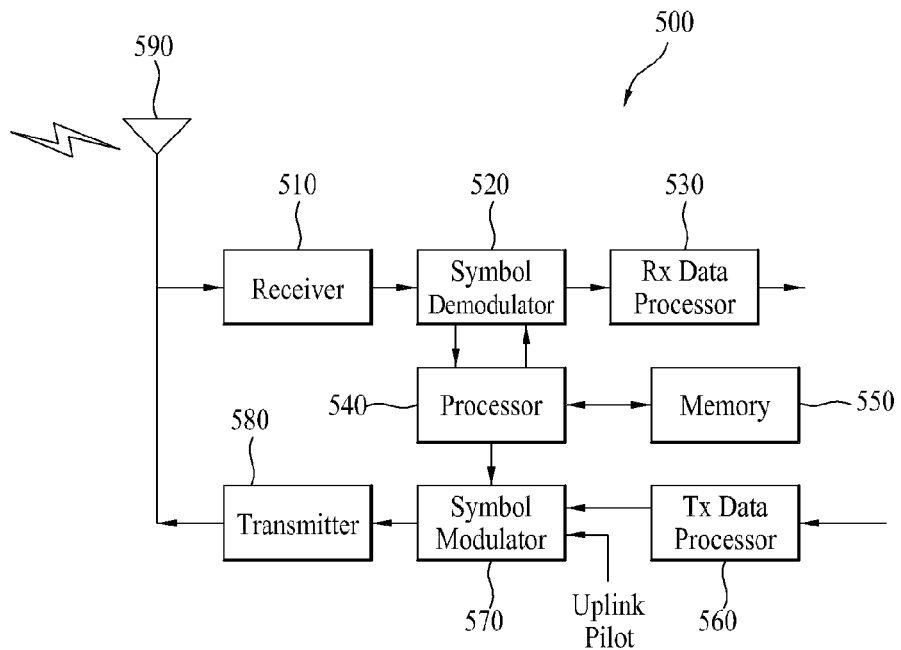
FIG. 5 is a schematic block diagram showing the configuration of a UE 500 for controlling inter-cell interference in a DAS of a multi-cell based environment.
Figure 6:
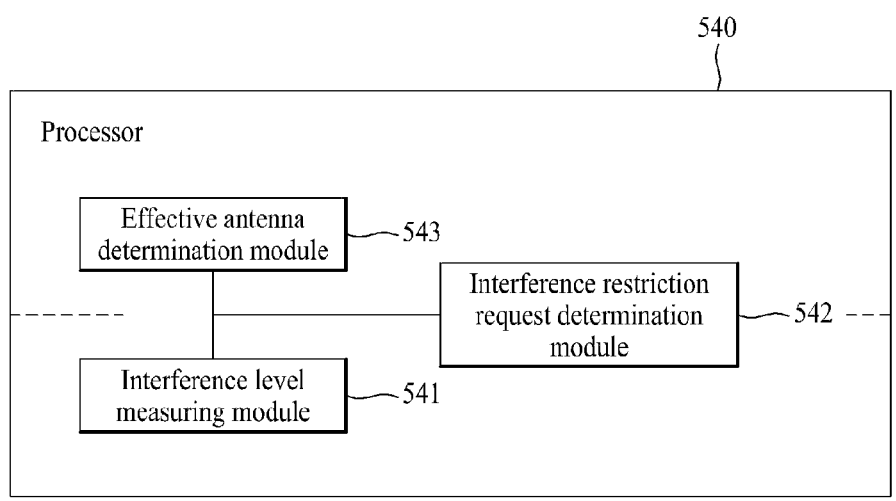
FIG. 6 is a block diagram showing the configuration of a processor 540 of the UE 500.

FIG. 5 is a schematic block diagram showing the configuration of a UE 500 for controlling inter-cell interference in a DAS of a multi-cell based environment, and FIG. 6 is a block diagram showing the detailed configuration of a processor 540 of the UE 500.

Referring to FIG. 5, the UE 500 may include a receiver 510, a symbol demodulator 520, an Rx data processor 530, a processor 540, a memory 550, a Tx data processor 560, a symbol modulator 570, a transmitter 580 and an antenna 590.

The receiver 510 may receive information on the number of antennas for one or more neighboring cells, information on the indexes of the antennas, and information on a reference signal of each neighboring cell from a serving eNB through the antenna 590. In this case, the received information on the antennas may be effective antennas.

The symbol demodulator 520 performs data demodulation with respect to data symbols corresponding to the information received by the receiver 510, and acquires and supplies data symbol estimation values to the Rx data processor 530.

Referring to FIG. 6, the processor 540 may include an interference level measuring module 541, an interference restriction request determination module 542, and an effective antenna determination module 543.

The interference level measuring module 541 may measure the interference level of each neighboring cell using at least one of the information on the number of effective antennas which cause interference to the UE 500, among antennas distributed in each neighboring cell, the information on the indexes of the effective antennas, and the information on the reference signal of each neighboring cell. The interference level measuring module 541 may use the information on the effective antennas of each neighboring cell, the information on the indexes of the effective antennas, and the information on the reference signal of each neighboring cell, all of which are received by the receiver 510, or may directly measure the interference level so as to obtain the information on the effective antennas of each neighboring cell, the information on the indexes of the effective antennas, and the information on the reference signal of each neighboring cell. The interference level measuring module 541 requires the antenna configuration information of the neighboring cells in order to more accurately measure the interference levels of one or more neighboring cells in the multi-cell DAS. The antenna configuration information may include at least one of the information on the number of effective antennas, the information on the indexes of the effective antennas, and the information on the reference signal of each neighboring cell. Hereinafter, the antenna configuration information will be described in brief.

1. Number of Effective Antennas in each Neighboring Cell

In the DAS, the UE 500 which performs the CoMP operation requires information on the number of effective antennas of each neighboring cell, which cause interference to the UE 500. That is, the interference level measuring module 541 of the UE 500 may measure interference of neighboring cells based on at least one of the received information on the effective antennas of each neighboring cell, the received information on the indexes of the effective antennas, and the received information on the reference signal of each reference signal, or the interference level measuring module 541 may measure interference of neighboring cells based on reference signals of the neighboring cells.

The interference restriction request determination module 542 compares the interference level of each neighboring cell with a predetermined threshold, and determines whether or not the UE 500 requests an interference restriction to each neighboring cell. The transmitter 580 may transmit an interference restriction request indication (or silencing indication) information to the serving eNB through the antenna 590.

Figure 7:
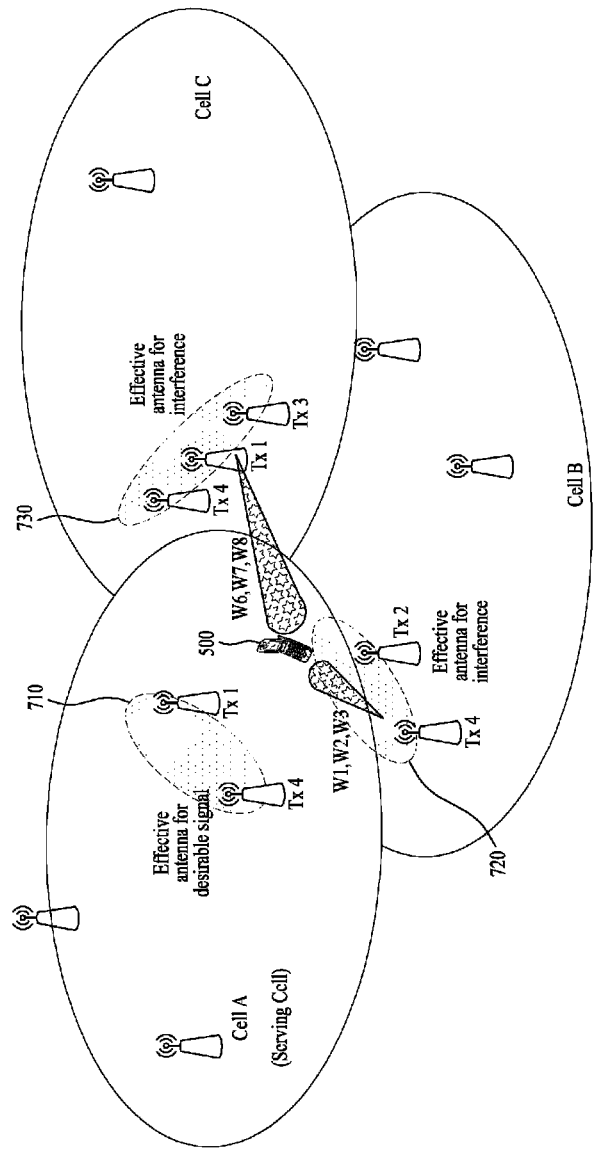
FIG. 7 is a diagram explaining a method for controlling inter-cell interference in a multi-cell based DAS.

FIG. 7 is a diagram explaining a method for controlling inter-cell interference in a multi-cell based DAS.

As shown in FIG. 7, it is assumed that three DAS cells each having four distributed antennas are present. The receiver 510 of the UE 500 belonging to the cell A (serving cell) may receive a desirable signal from an antenna group 710 including distributed antennas 1 and 4 (Tx 1 and Tx 4) of the cell A through the antenna 590. In this case, if the processor 540 of the UE 500 selects a best PMI from two transmission antennas based codebooks, the transmitter 580 transmits the best PMI to the serving cell.

In addition, the UE 500 may receive strong interference from the effective antenna group 720 (antennas 2 and 4) including two distributed antennas of the cell B. In addition, the UE 500 receives strong interference from the effective antenna group 730 (antennas 1, 3, and 4) including three distributed antennas of the cell C.

In order to enable the interference level measuring module 541 to accurately measure the interference levels of the neighboring cells (that is, the cell B and the cell C) and to enable the UE 500 to report more accurate interference restriction indication (that is, silencing indication) information, the UE 500 needs to receive the number of effective antennas, which cause interference to the UE, from each cell. That is, the interference level measuring module 541 of the UE 500 may measure an interference degree (or an interference level) using the signal received from the effective antenna group 720 including two distributed antennas of the cell B. Similarly, the interference level measuring module 541 may measure an interference degree using the signal received from the effective antenna group 730 including three distributed antennas of the cell C. Accordingly, if the UE 500 knows the information on the number of effective antennas of each of the cell B and the cell C, it is possible to more accurately and efficiently measure the interference levels of the neighboring cells. Therefore, it is possible to perform the CoMP operation with respect to the UE 500 located at the cell edge and to reduce and control interference from one or more neighboring cells to which the DAS is applied.

(2) Indexes of Effective Antennas

In order to enable the interference level measuring module 541 of the UE 500 to efficiently measure the interference levels of the neighboring cells (e.g., the cell B and the cell C), the information on the indexes of the effective antennas are required in addition to the information on the number of effective antennas of the neighboring cells. The antenna ports (distributed antennas) of each cell may transmit respective reference signals in different time and frequency domains (including a TDM scheme, an FDM scheme, and a CDM scheme). Accordingly, it is difficult for the interference level measuring module 541 to accurately measure interference only using information indicating how many distributed antennas configure the effective antenna group, which is received from the neighboring cells. Accordingly, in addition to the number of effective antennas, the UE 500 may receive information on the substantial indexes of the antennas such that the interference level measuring module 541 may accurately measure the interference level corresponding to the number of distributed antennas.

For example, as shown in FIG. 7, it is assumed that three DAS cells each having four distributed antennas are present. The UE 500 receives strong interference from the effective antenna group 720 including antennas 2 and 4 among the four distributed antennas of the neighboring cell B and receives strong interference from the effective antenna group 730 including antennas 1, 3 and 4 among the four distributed antennas of the cell C. The interference level measuring module 541 may more accurately measure neighboring cell interference, if the information on the indexes of the effective antenna groups 720 and 730 of the neighboring cells are known.

(3) Information on Reference Signal of Neighboring Cells, for Interference Measurement If the interference level measuring module 541 measures the interference levels of the neighboring cells using the information on the reference signal of the neighboring cells, it is possible to more accurately measure the interference levels. The UE 500 may implicitly know the reference signal of the neighboring cells defined in advance according to a cell identifier or the eNB may directly and explicitly inform the UE 500 of the reference signal of the neighboring cells. The interference level measuring module 541 of the UE 500 may accurately measure the intensity of the interference by measuring the time and frequency domains, in which the reference signals of the neighboring cells are transmitted, based on at least one of the information on the number of effective antennas, information on the indexes of the effective antennas, and information on the reference signal of the neighboring cells, and the UE 500 can accurately obtain information on a PMI which causes interference. Through such a process, the UE 500 can efficiently perform the CS/CB scheme or the JP scheme between the cells in the multi-cell environment to which the DAS is applied.

The interference restriction request determination module 542 may compare the interference levels of the neighboring cells measured by the interference level measuring module 541 with the predetermined threshold and determine whether or not the interference restriction request is transmitted to the neighboring cells. The interference restriction request determination module 542 may determine whether or not the information on the interference restriction (that is, silencing) request is transmitted to the serving eNB, based on the predetermined threshold (e.g., channel quality and interference level). The interference restriction request determination module 542 may transmit the interference restriction (that is, silencing) request to the serving eNB if the measured interference values of the neighboring cells exceed the predetermined threshold.

The transmitter 580 may transmit the information on one or more neighboring cells, to which the interference restriction request will be transmitted, to the serving eNB. Therefore, it is possible to reduce or eliminate inter-cell interference while minimizing uplink feedback overhead.

UE-specific Silencing for DAS (1) eNB-centric Indication Method

Figure 8:
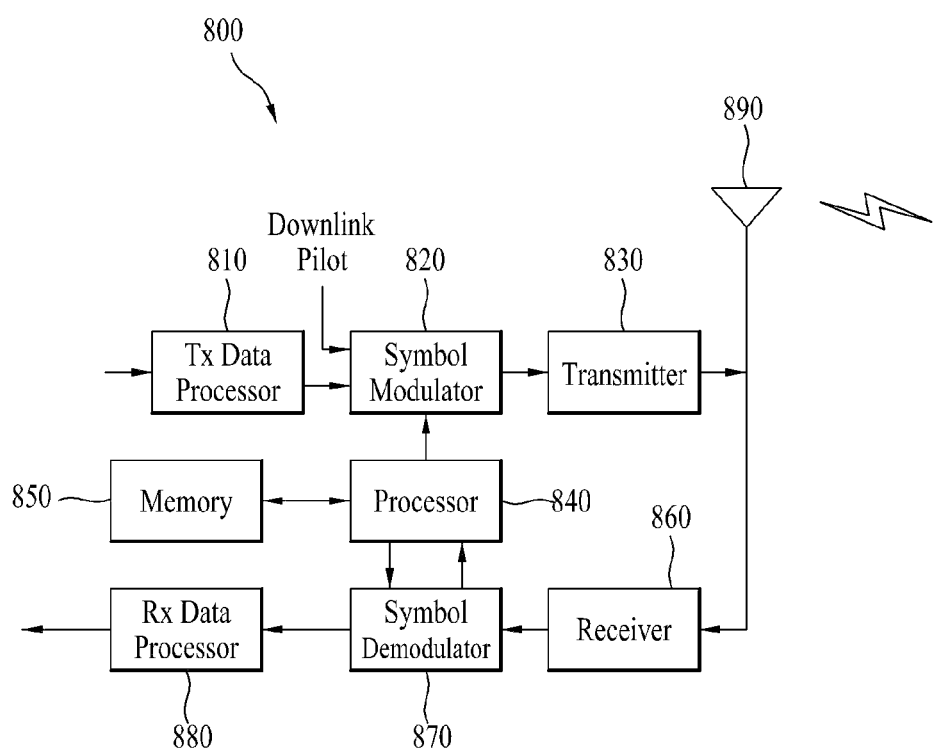
FIG. 8 is a block diagram showing the configuration of an eNB according to the present invention.

FIG. 8 is a block diagram showing the configuration of an eNB according to the present invention.

Referring to FIG. 8, the eNB 800 may include a Tx data processor 810, a symbol modulator 820, a transmitter 830, a processor 840, a memory 850, a receiver 860, a symbol demodulator 870, an Rx data processor 880 and an antenna 890.

If cells of the DAS cooperatively operate (CoMP), the transmitter 830 of the eNB 800 may transmit antenna configuration information (effective antenna number information and effective antenna index information) of one or more neighboring cells to the UE 500 through the antenna 890. That is, an eNB-centric indication method of enabling the eNB 800 (that is, the serving eNB 800) of the serving cell A to indicate the antenna configuration information to the UE 500 may be employed. The eNB 800 of the serving cell A directly indicates one or more of the information on the number of effective antennas of the neighboring cells, the information on the effective antenna indexes and the information on reference signal of the neighboring cells to the UE 500. The serving eNB 800 may indicate the antenna configuration information to the UE 500 through higher layer signaling or L1/L2 control signaling. The interference level measuring module 541 of the UE 500 may accurately and efficiently measure the interference of the neighboring cells based on the antenna configuration information received from the eNB 800 of the serving cell A. The interference restriction request determination module 542 may determine to request silencing of the neighboring cells if the measured interference value exceeds a specific threshold. In this case, the transmitter 580 of the UE 500 may transmit only information about the interference restriction request (that is, silencing indication) having a size of 1 bit to the serving eNB 800. Additionally, the transmitter 580 of the UE 500 may feed back the cell IDs of the neighboring cells or the cell ID indexes to the serving eNB 800. If the serving cell A and the UE 500 share the information about the neighboring cells and the silencing indication information feedback order of the neighboring cells is previously set, the serving eNB 800 may identify with which neighboring cell the silencing indication information is associated using only the silencing indication information, without any need for the cell IDs or the cell ID indexes.

For example, it is predefined in advance that the DAS is configured as shown in FIG. 7 and the UE 500 feeds back the silencing indication information to the cell B and the cell C in turn. If the UE 500 requests silencing only to the cell B, the transmitter 580 of the UE 500 may transmit feedback (cell B: silencing on, cell C: silencing off) having a size of 2 bits ("10") to the serving eNB 800 or the neighboring cell B. Since the cells can share the information about the effective antennas, it is possible to perform silencing of the effective antennas only using silencing on/off information. That is, the cell B may turn off the distributed antennas 2 and 4 (530) which cause interference to the UE 500.

(2) UE-centric Indication Method

In the above description, the eNB-centric indication method of enabling the serving eNB 800 to transmit the antenna configuration information of the neighboring cells to the UE 500 was described. In contrast, the serving base station 800 may indicate only some of the antenna configuration information of the neighboring cells to the UE 500 and the UE 500 may directly measure and determine the remaining antenna configuration information. In such a UE-centric indication method, it is possible to accurately measure the effective antennas of the neighboring cells which substantially cause interference to the UE. In the UE-centric indication method, the UE 500 determines the antenna configuration information of the neighboring cells which substantially cause interference to the UE 500. In this method, the serving eNB 800 may indicate the reference signal information of the neighboring cells of the antenna configuration information to the UE 500. If the reference signal of the neighboring cells are predefined according to cell IDs, the processor 540 of the UE 500 may read and decode the cell IDs of the neighboring cells and implicitly identify the reference signal of the neighboring cells.

In the UE-centric indication method, the transmitter 580 of the UE 500 may transmit antenna configuration information selected by direct measurement to the serving eNB 800, in addition to the silencing indication information which is the feedback information of the UE in the eNB-centric indication method. The processor 540 of the UE 1 may control the feedback of the effective antenna number information and the effective antenna index information except the reference signal of the neighboring cells of the antenna configuration information, and the transmitter 580 transmits only the effective antenna number information and the effective antenna index information to the serving eNB 800. The effective antenna determination module 543 of the UE 500 may measure and determine the number of effective antennas which cause most significant interference to the UE 500 and the antenna indexes based on the reference signal of the neighboring cells. The effective antenna determination module 543 of the UE 500 may use a predetermined threshold in order to determine the number of effective antennas and the antenna indexes. In order to reduce feedback, the number of effective antennas which may be selected by the UE 500 for the purpose of interference restriction may be defined in advance. In this case, the antenna indexes alone may be fed back to the serving eNB 800. Alternatively, the UE 1 (510) may feed back only the silencing indication information, and the antenna configuration information may be used only in the measurement. If the UE 1 510 feeds back only the silencing indication information, the effective antenna determination module 543 determines the predefined number of effective antennas and the effective antenna indexes, and the transmitter 580 may feed back the information on the predetermined number of effective antennas and/or the effective antenna indexes to the serving eNB 800. Then, the serving eNB 800 may request that the neighboring cells perform interference restriction (that is, silencing) in specific subbands/subframes of those antennas.

Cell-specific Silencing for DAS

It is assumed that the UE 500 which performs the CoMP operation is located at the cell edge where a sufficient channel state from the serving cell A is not guaranteed or severe interference from one or more neighboring cells is received. The UE 500 located at the cell edge moves at a low speed and receives data at Rank 1. In case of the UE 500 which performs the CoMP operation and is located at the cell edge, the method based on the feedback information of the UE increases uplink feedback overhead and backhaul overhead.

Accordingly, a method based on a beam pattern (e.g., PMI) which is predefined upon cell deployment may be employed. Upon initial cell deployment, effective antennas including specific antennas of cells and the beams (e.g., PMIs) of the effective antennas having a specific directivity are predefined. In general, the beam pattern of Rank 1 has more explicit directivity than the beam of a higher rank. The cells may share the information about the effective antennas which cause interference among neighboring cells and the beam patterns having the specific directivity of the effective antennas. Accordingly, if a specific cell (e.g., a cell A) which performs the CoMP operation receives the request for the restriction of the effective antennas or the effective antenna beam patterns from another specific cell (e.g., a cell B), it is possible to reduce interference of another specific neighboring cell (e.g., the cell B) by restricting the effective antennas which cause interference to the specific neighboring cell or the group of the effective antenna beams having directivity to the specific cell.

That is, while the existing method is a UE-specific beam restriction method enabling neighboring cells to restrict/recommend or silence a specific PMI which causes interference to the UE, this method is a cell-specific silencing method of enabling the neighboring cells to restrict predefined effective antennas having directivity to the UE or a beam pattern group (e.g., a PMI set) of effective antennas. Upon cell deployment, the beam pattern group having directivity between cells may include a uniform number of beam patterns or a non-uniform number of beam patterns, for a specific purpose. That is, the transmitter 580 of the UE 500 which receives interference from the neighboring cells may transmit silencing indication information to the serving eNB 800. By the transmission of the silencing indication information, the neighboring cells restrict specific PMIs (beam pattern groups) of the effective antenna group having directivity to the serving cell (e.g., SDM), silence a specific subband (e.g., FDM), or silence a specific time resource region (e.g., TDM), thereby reducing interference on the UE 500.

The interference restriction of the neighboring cells may be performed by a specific PMI set of a specific effective antenna group or may be performed with respect to the time and frequency resource region of the specific effective antenna group. The transmitter 830 of the serving eNB 800 may transmit the above-described antenna configuration information to the UE 500, and the UE 500 may perform feedback without the antenna configuration information of the serving eNB 800. In the cell-specific silencing method according to the present invention, the UE feeds back the silencing indication information without receiving the antenna configuration information.

It is assumed that the number of cells which perform the CoMP operation in the DAS is three. Description will be given with reference to FIG. 7. The UE 500 belongs to the cell A. The effective antennas including the antennas 2 and 4 (Tx2 and Tx4) of the cell B and the antennas 1, 3 and 4 (Tx1, Tx3 and Tx4) of the cell C substantially cause interference to the cell A. Beam pattern groups W1, W2 and W3 and W6, W7 and W8 having directivity to the cell A of the beam patterns of Rank 1 of the effective antennas, which are predefined upon cell deployment, are present.

If the UE 500 which belongs to the cell A but is located at the cell edge receives a severe interference signal from the cells B and C, the transmitter 580 of the UE 500 or the transmitter 830 of the eNB 800 of the serving cell A may feed back the interference restriction request (that is, silencing request) for the effective antennas, which substantially cause interference to the cell A, to the cells B and C. That is, the transmitter 580 of the UE 500 may transmit information requesting restriction of the use of the effective antennas including the antennas 2 and 4 (Tx2 and Tx4) and the antennas 1, 3 and 4 (Tx1, Tx3 and Tx4) to the serving eNB 800 or the cells B and C. Alternatively, the transmitter 830 of the eNB 800 of the serving cell A may transmit information requesting restriction of the use of the effective antennas to the cells B and C.

Figure 9:
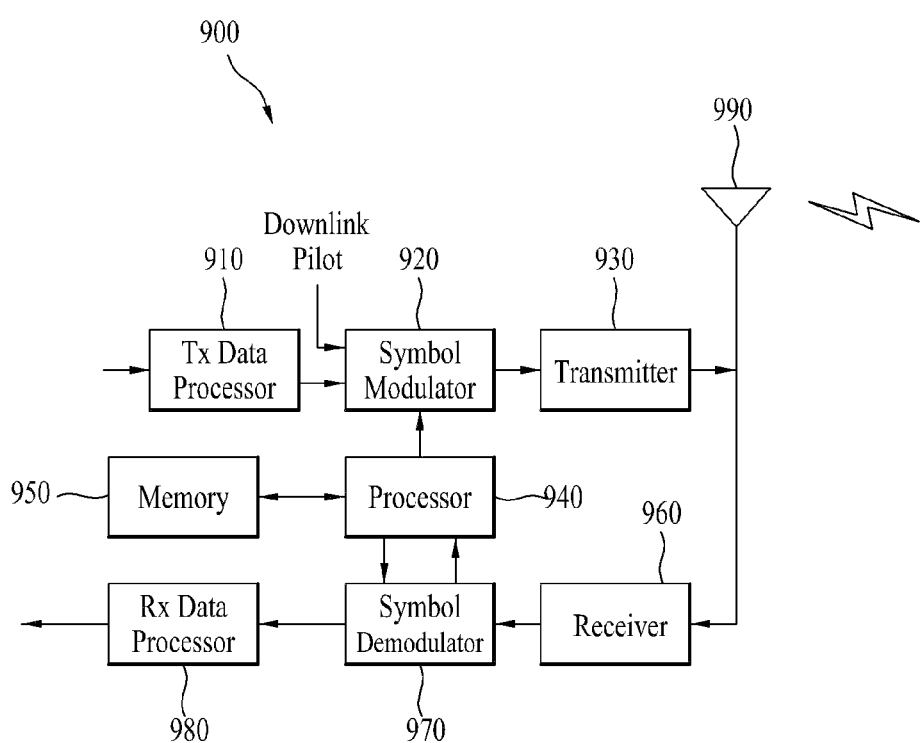
FIG. 9 is a block diagram showing the configuration of an eNB 900 of a neighboring cell according to the present invention.

FIG. 9 is a block diagram showing the configuration of an eNB 900 of a neighboring cell according to the present invention, Referring to FIG. 9, similar to the serving eNB 800 shown in FIG. 8, the eNB 900 may include a Tx data processor 910, a symbol modulator 920, a transmitter 930, a processor 940, a memory 950, a receiver 960, a symbol demodulator 970, an Rx data processor 980 and an antenna 990. The eNB 900 of the neighboring cell may correspond to the eNB of the cell B or the cell B shown in FIG. 7.

The receiver 960 receives the interference restriction request (or the silencing request) from the UE 500 or the serving eNB 800 of the UE 500 through the antenna 990.

The processor 940 may control transmission of a signal with power equal to or less than a predetermined level in a specific subband or time resource region used by the UE 500 through the effective antennas which cause interference to the UE 500 of the cell A, or disable transmission of a signal such as data or a reference signal. If the receiver 960 of the neighboring eNB 900 receives the restriction request information of the beam pattern group having directivity to the cell A among the effective antennas of the cell to which the neighboring eNB 900 belongs, the processor 940 enables the restriction of the use of the beam pattern groups W1, W2 and W3 and W6, W7 and W8 of the effective antennas. The processor 940 may control the restriction of the specific beam pattern groups or the silencing of the specific effective antennas in specific subframes or subbands. The interference restriction in the specific subframes or subbands may be requested by the serving eNB 800 or may be determined by the neighboring eNB 900.

Hereinafter, a feedback information transmission method and a triggering method in the cell-specific silencing method will be described.

The UE 500 may request cell-specific silencing when a specific condition is satisfied. When the channel state measured by the interference level measuring module 541 is not satisfied, the interference restriction request determination module 542 may determine that cell-specific beam avoidance needs to be requested. The determination of the channel state of the interference level measuring module 541 may depend on whether or not the measurement is performed with respect to neighboring cells.

The case where the interference level measuring module 541 does not perform measurement with respect to the neighboring cells will be described first. If communication based on single cell is performed in a state in which the interference level measuring module 541 does not performs measurement with respect to the neighboring cells, the interference restriction request determination module 542 may determine whether or not a cell-specific interference restriction (or silencing) request is performed, by the channel state such as Channel Quality Information (CQI) and the comparison between the noise and interference level from the remaining cells except the serving cell and a threshold. In this case, the transmitter 580 of the UE 500 may transmit the interference restriction request for the neighboring cells to the eNB 800 of the serving cell A in the form of a message having a predetermined bit size (e.g., 1 bit). The transmitter 580 of the UE 500 transmits the interference restriction request message to the serving eNB 800 in the form of a Physical Uplink Control Channel (PUCCH), a Physical Uplink Shared Channel (PUSCH) or a Radio Resource Control (RRC), thereby performing a cell-specific interference restriction request (silencing request). When the receiver 860 of the eNB 800 receives the cell-specific interference restriction request from the UE 500, the processor 840 may control the cell-specific interference restriction request to be transmitted to the neighboring eNB 900.

Next, the case where the interference level measuring module 541 performs measurement with respect to the neighboring cells will be described. After the interference level measuring module 541 performs measurement with respect to the neighboring cells B and C, the interference restriction request determination module 542 determines whether or not the interference restriction (or silencing) request is transmitted to the neighboring cells B and C, by the channel state of the serving cell A and the comparison between the interference levels of the neighboring cells B and C which perform the CoMP operation and the threshold. In a state in which the UE 50 acquires the antenna configuration information, the interference level measuring module 541 may more accurately measure the interference of the effective antennas. In a state in which the antenna configuration information is not acquired, after the interference values from all the antennas of the neighboring cells are roughly calculated, the interference restriction request determination module 542 may determine whether or not the interference restriction (or silencing) request is performed based on the roughly calculated interference levels. In this case, after the interference level measuring module 541 of the UE 500 performs measurement, the transmitter 580 may determine whether or not the measured information is transmitted through the antenna 590.

The case where the transmitter 580 transmits the measured information to the serving eNB 800 after the interference level measuring module 541 performs measurement will be described. The interference level measuring module 541 may perform measurement in the form of Reference Signal Received Power (RSRP), Reference Signal Received Quality (RSRQ), etc. with respect to the neighboring cells and the transmitter 580 may transmit the RSRP or RSRQ and the cell IDs of the neighboring cells to the serving eNB 800 through the antenna 590. When the receiver 860 of the serving eNB 800 receives the measured information of the neighboring cells, the serving eNB 800 may check the neighboring cell ID information, the interference level, etc.

The interference restriction request determination module 542 may determine whether or not the cell-specific interference (or silencing) request is performed, by the comparison between the interference levels of the neighboring cells measured by the interference level measuring module 541 and the threshold. The interference restriction request determination module 542 may determine that one or more neighboring cells which cause most significant interference need to be requested to perform interference restriction (or silencing). If the interference restriction request determination module 542 determines to perform the interference restriction request with respect to one or more neighboring cells, the interference restriction request determination module 542 may determine to perform the interference restriction request with respect to predefined N neighboring cells or may determine to perform the interference restriction request with respect to neighboring cells having the interference levels exceeding the threshold.

Similarly, the transmitter 580 of the UE 500 may transmit the interference restriction request for the neighboring cells to the eNB 800 of the serving cell A in the form of a message having a predetermined length in bits (e.g., 1 bit). The transmitter 580 of the UE 500 transmits the interference restriction request message to the serving eNB 800 in the form of a Physical Uplink Control Channel (PUCCH), a Physical Uplink Shared Channel (PUSCH) or a Radio Resource Control (RRC), thereby performing cell-specific interference restriction request (silencing request). The transmitter 580 of the UE 500 may transmit the interference restriction request in descending order of interference levels of the neighboring cells regardless of the cell IDs or the cell ID indexes together with the cell ID indexes of the neighboring cells to be restricted or may transmit only the cell ID indexes.

When the receiver 860 of the serving eNB 800 receives the information measured by the interference level measuring module 541 from the UE 500, the processor 840 may classify the measured information of the neighboring cells in order of interference levels. The classified information may be shared between the UE 500 and the serving eNB 800 without separate signaling. The processor 840 may determine the neighboring cells, to which the interference restriction request will be transmitted, without the cell ID indexes based on the classification information, and the transmitter 830 may transmit the interference restriction request signal for specific effective antennas and the beam pattern group to the determined neighboring cells.

The case where the UE 500 does not transmit the measured information to the serving eNB 800 after the interference restriction request determination module 542 performs measurement will be described. In this case, the transmitter 580 of the UE 500 may transmit the interference restriction request message and the cell IDs and the cell ID indexes of the neighboring cells, the interference of which will be restricted, or transmit only the cell IDs and the cell ID indexes to the serving eNB 800. Alternatively, if the serving eNB 800 and the UE 500 share the information about the neighboring cells and the order of interference restriction request indications (or silencing request indications) of the neighboring cells are defined in advance, the processor 840 may identify with which neighboring cell the interference restriction request indication (silencing indication) information is associated, using only the interference restriction request indication (or the silencing request indication), without the cell IDs or the cell ID indexes. The processor 840 controls the transmission of the interference levels of the neighboring cells in addition to the interference restriction request indication, and the transmitter 830 may transmit the interference level information of the neighboring cells in addition to the interference restriction request indication information. The interference restriction request determination module 542 may determine whether or not the interference restriction request is performed with respect to the neighboring cells, by comparison between the threshold and the measured value. By this process, the transmitter 580 of the UE 500 may transmit the interference restriction request (or silencing request) signal to one or more neighboring cells.

The receiver 860 of the serving eNB 800 may receive the interference restriction request signal from the UE 500 and then transmit the signal requesting restriction of the use of the specific effective antennas and the specific beam pattern groups to the neighboring cells. Alternatively, after the interference restriction request determination module 542 determines whether or not the interference restriction request is performed by comparison with the threshold, the transmitter 580 of the UE 500 may transmit the interference restriction (or silencing) request signal of nonspecific neighboring cells to the serving eNB 800. In this case, the transmitter 580 of the UE 500 may transmit one restriction request message to the serving eNB 800 regardless of the cell IDs, and the processor 840 of the serving eNB 800 may control the request for the restriction of the use of one or more effective antennas and the beam pattern groups having directivity to the serving cell to the neighboring cells geographically located close to the serving cell.

The cell-specific interference restriction (or silencing) request may be arbitrarily triggered by the serving eNB 800. In communication based on a single cell, the receiver 860 of the eNB 800 periodically or non-periodically receives single cell based channel information from the UE 500. The processor 840 of the serving eNB 800 may determine that the interference restriction request is arbitrarily transmitted to the neighboring cells by the comparison between the channel information received from the UE and the predefined threshold. Alternatively, if the receiver 860 of the serving eNB 800 receives the measured information from the UE 500, the processor 840 of the serving eNB 800 may restrict the effective antennas and the beam pattern group having directivity to its cell, with respect to a neighboring cell which causes most significant interference, a predetermined number of neighboring cells with strong interference, or neighboring cells with interference exceeding the threshold.

Hereinafter, a method of exchanging information between eNBs (or cells) will be described.

The transmitter 580 of the UE 500 transmits the cell-specific interference restriction (or silencing) request or the serving eNB 800 arbitrarily transmits cell-specific interference restriction (or silencing) request, the serving eNB 800 may transmit or receive associated information such as information about the neighboring cells, the effective antennas and the beam pattern group restriction and the interference level. In this way, it is possible to efficiently perform cell-specific interference restriction (or silencing) request between the cells.

The processor 840 of the serving eNB 800 enables a message requesting restriction of the effective antennas and the beam pattern groups having directivity to its cell to the neighboring cells. The receiver 960 of the neighboring eNB 900 receives the interference restriction request messages from several cells, and the processor 940 controls the restriction of the effective antennas and the beam patterns based on the interference restriction request messages. However, if the neighboring eNB receives the interference restriction requests from several cells, the processor 940 needs to solve a ranking problem associated with a determination as to which effective antenna or beam pattern is restricted.

In order to solve this problem, the receiver 860 of the serving eNB 800 may receive information about the interference levels generated by the neighboring cells, etc. in addition to the interference restriction request message. The processor 940 may determine which effective antenna or beam pattern is restricted using the interference restriction request message received by the receiver 860 and the interference level information of the neighboring cells.

Figure 10:
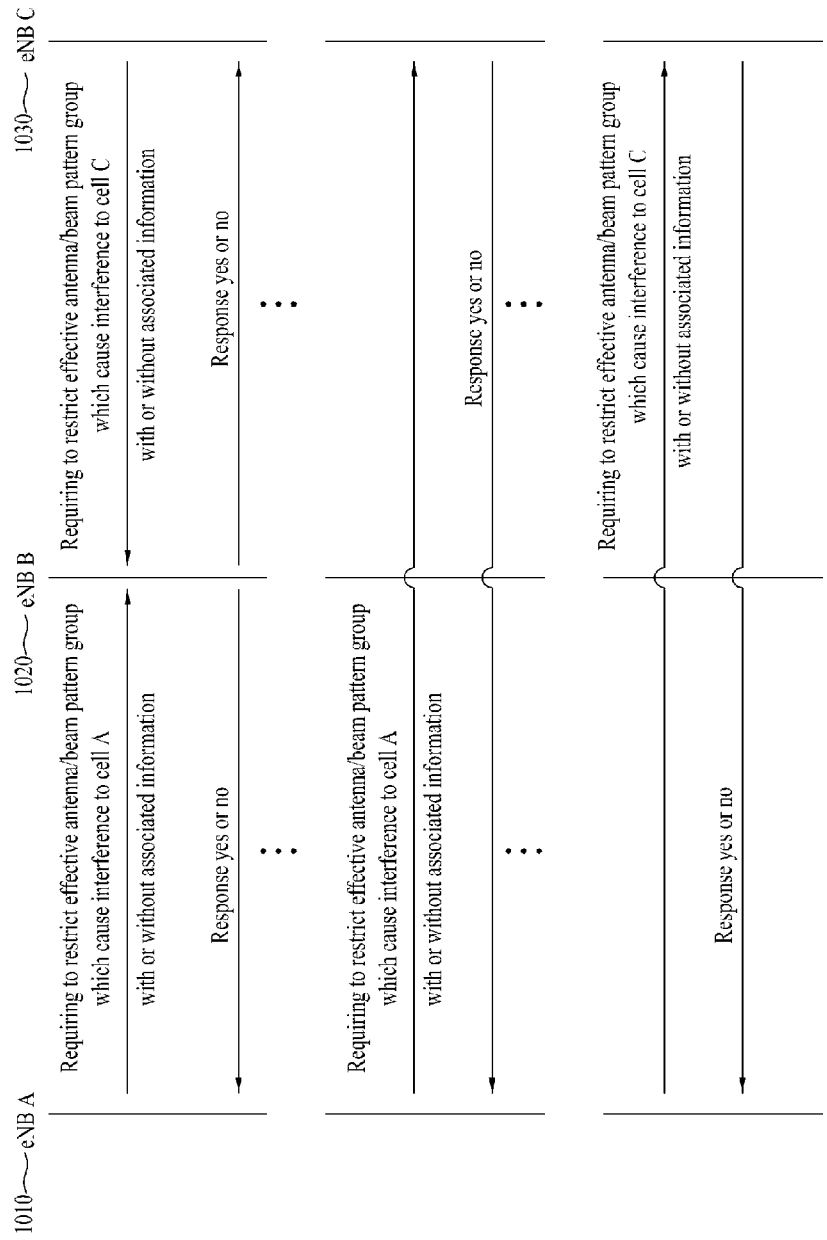
FIGS. 10 and 11 are diagrams showing examples of a process of exchanging information between eNBs.
Figure 11:
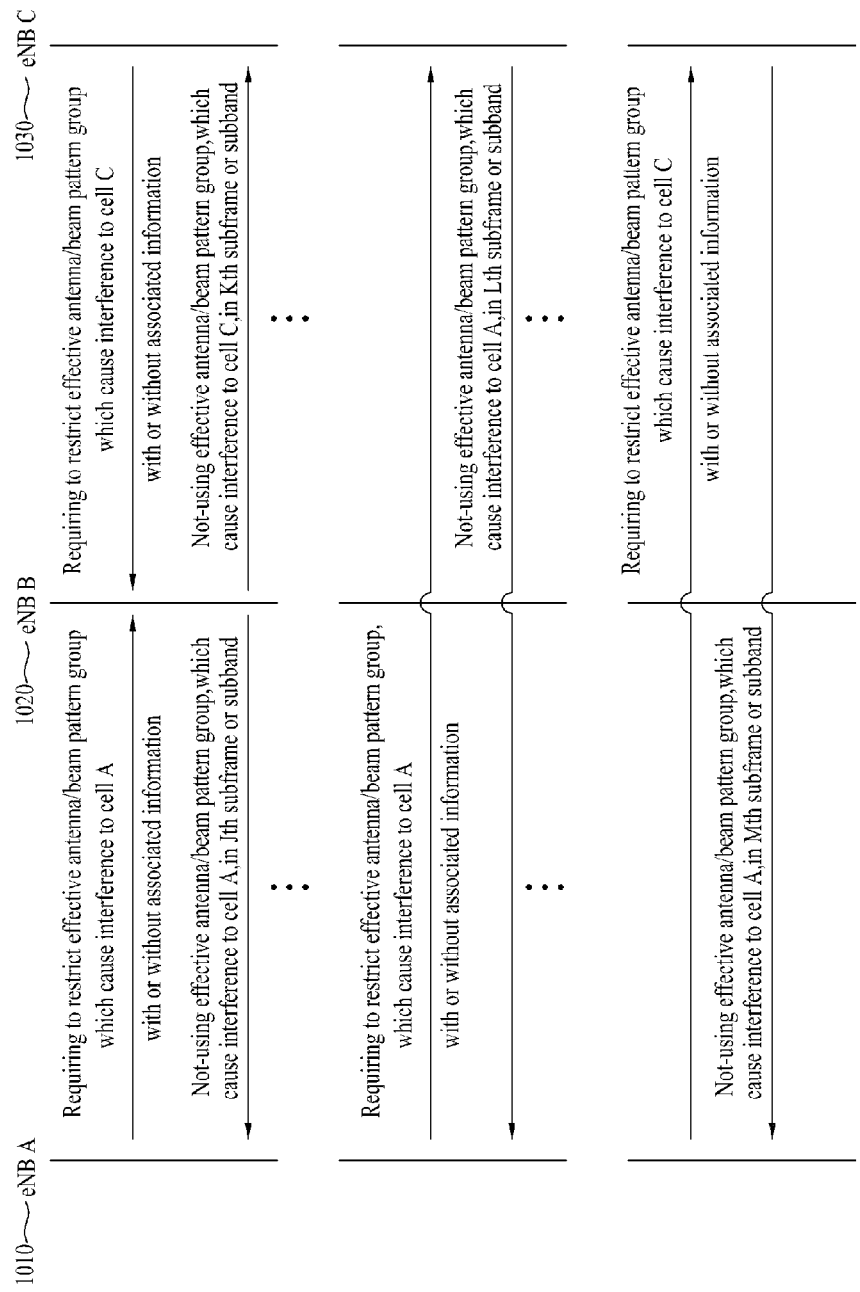

FIGS. 10 and 11 are diagrams showing examples of a process of exchanging information between eNBs.

As described above, the eNBs may exchange associated information such as the restriction request for the effective antennas and the beam pattern groups and the interference level measurement information, and scheduling information. In a multi-cell environment using the DAS, it is assumed that an eNB A 1010 belonging to the cell A, an eNB B 1020 belonging to the cell B, and an eNB C 1030 belonging to the cell C are present.

The eNB A 1010 may transmit a signal requesting restriction of the use of the specific effective antennas and specific beam pattern groups, which cause interference to the cell A, to which the eNB A belongs, to the eNB B and C 1020 and 1030, which are neighboring eNBs, and the eNB C 1030 may transmit a signal for requesting the restriction of the use of the specific effective antennas and specific beam pattern groups, which cause interference to the cell C, to the eNBs A and B 1010 and 1020 which are the neighboring eNBs. The eNB B 1020 may transmit a response "yes" or "no" for the interference restriction request to the eNB A 1010 and the eNB C 1030, the eNB A 1010 transmits a response "yes" or "no" for the interference restriction request to the eNB C 1030, and the eNB C 1030 may transmit a response "yes" or "no" for the interference restriction request to the eNB A 1010. Alternatively, as shown in FIG. 11, the eNB B 1020 may transmit a signal indicating that the use of the specific effective antennas and specific beam pattern groups which cause interference to the cell A is restricted in a J-th subframe or subband to the eNB A 1010, and transmit a signal indicating that the use of the specific effective antennas and specific beam pattern groups which cause interference to the cell C is restricted in a K-th subframe or subband to the eNB C 1030. The eNB C 1030 may transmit a signal indicating that the use of the specific effective antennas and specific beam pattern groups which cause interference to the cell A is restricted in an L-th subframe or subband to the eNB A 1010, and transmit a signal indicating that the use of the specific effective antennas and specific beam pattern groups which cause interference to the cell A is restricted in an M-th subframe or subband to the eNB C 1030.

In the case where the use of the effective antennas and the beam pattern groups is restricted over the entire band or the entire radio frame with respect to a specific cell, UEs within the specific cell suffer from considerable performance deterioration. Accordingly, it is possible to efficiently use transmission resources by the efficient time and frequency resource allocation between the eNBs and scheduling of the transmission information. That is, the eNBs share scheduling for applying the restriction for the specific cell to a specific subframe or subband such that the effective antennas which cause interference and the beam patterns can be efficiently used in subframe or subband units.

The scheduling information may be shared among the eNBs 1010, 1020 and 1030 through an X2 interface as L1/L2 control information or L3 RRC connection control information. The method of sharing scheduling information among the eNBs will be briefly described.

Figure 12:
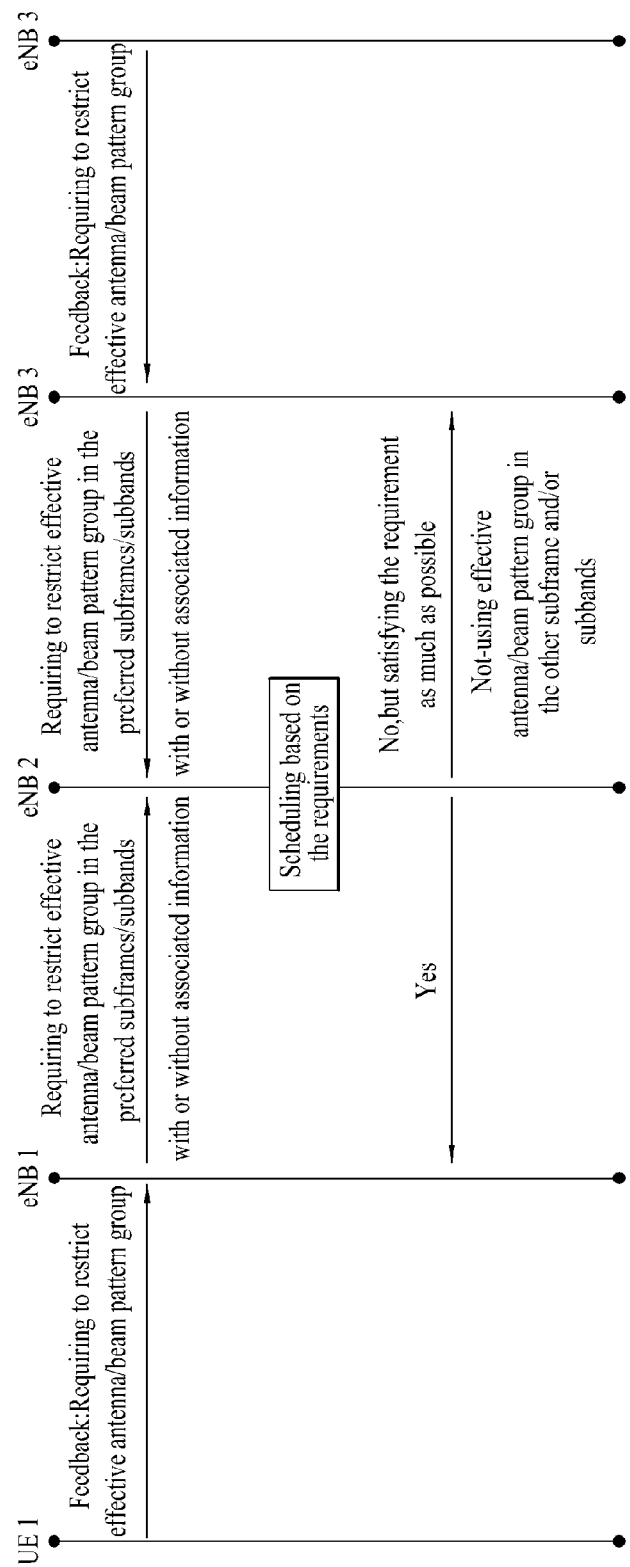
FIG. 12 is a diagram showing an example of a process of performing scheduling with respect to an interference restriction request and sharing scheduling information between eNBs, by an eNB 2 which is a neighboring eNB.

FIG. 12 is a diagram showing an example of a process of performing scheduling with respect to an interference restriction request and sharing scheduling information between eNBs, by an eNB 2 which is a neighboring eNB.

Referring to FIG. 12, an eNB 1 and an eNB 3 receive signals for requesting the restriction of the use of specific effective antennas and specific beam pattern groups from a UE 1 and a UE 2, respectively. Then, the eNB 1 and the eNB 3 may transmit signals for requesting the restriction of the use of the specific effective antennas and the specific beam pattern groups in preferred subframes and/or subbands to the eNB 2 which is the neighboring eNB, respectively. At this time, the eNB1 and the eNB3 may further transmit associated information including the interference level information of the neighboring eNB, etc. to the eNB 2 which is the neighboring eNB, respectively. The processor of the eNB 2 performs scheduling based on interference restriction request information received from the eNB 1 and the eNB 3. The processor of the eNB 2 performs scheduling using the associated information if the associated information is received from the eNB 1 and the eNB 3. After the processor of the eNB 2 performs scheduling, for example, the transmitter of the eNB 2 may transmit a response signal "yes" indicating that the interference is restricted in response to the interference restriction request to the eNB 1, but may transmit a response signal "no" in response to the interference restriction request to the eNB 3. If the eNB 2 rejects the interference restriction request of the eNB 3, a proposal based on a second best plan may be transmitted. That is, the eNB 2 may transmit a response signal indicating that the effective antennas and the beam pattern groups will not be used in the subframes or subbands other than the specific subframes or subbands requested by the eNB 3.

Figure 13:
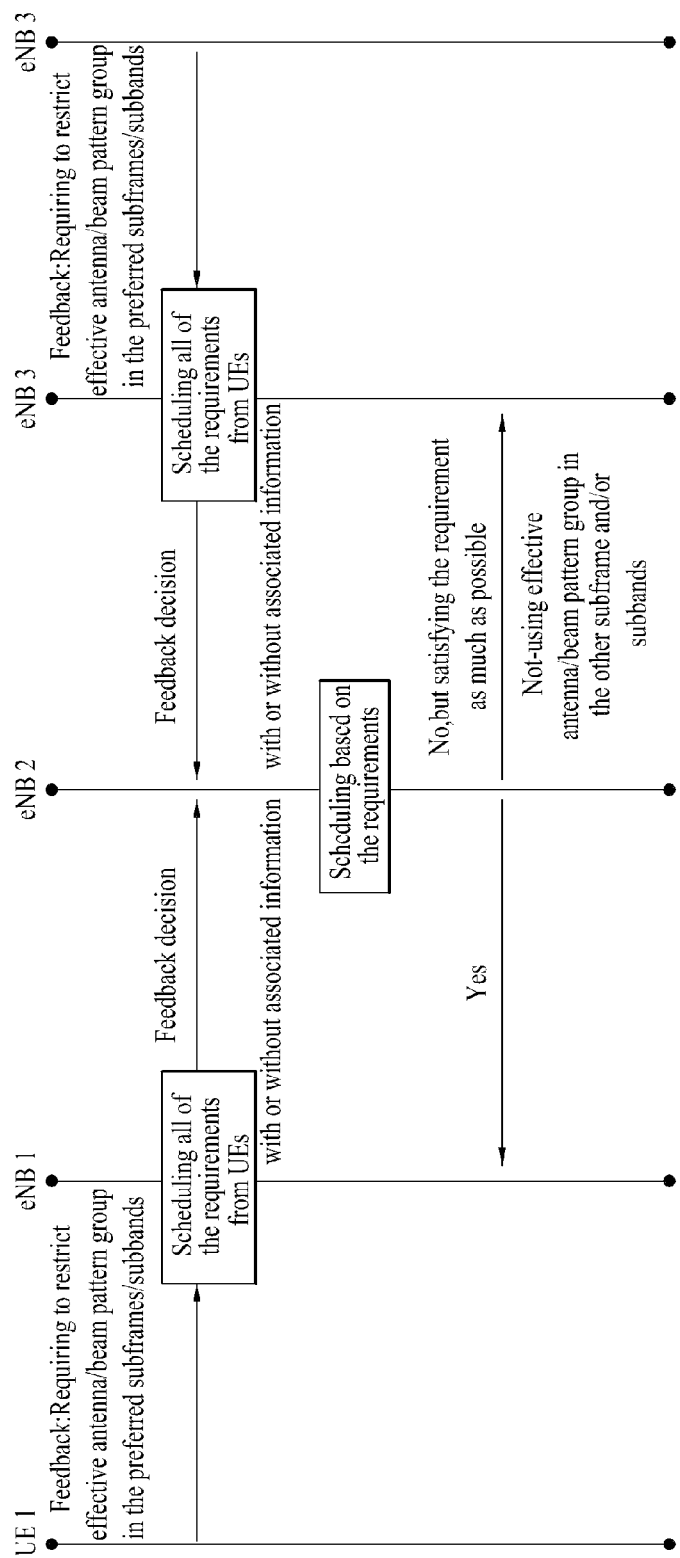
FIG. 13 is a diagram showing another example of a process of performing scheduling with respect to an interference restriction request and sharing scheduling information between eNBs, by an eNB 2 which is a neighboring enB.

FIG. 13 is a diagram showing another example of a process of performing scheduling with respect to an interference restriction request and sharing scheduling information between eNBs, by an eNB 2 which is a neighboring enB.

Referring to FIG. 13, an eNB 1 and an eNB 3 receive signals requesting restriction of the use of specific effective antennas and specific beam pattern groups from a UE 1 and a UE 2, respectively. That is, the UE 1 and the UE 3 may perform scheduling and transmit the signals requesting restriction of the use of the specific effective antennas and the specific beam pattern groups in specific subframes or subbands to the eNB 1 and the eNB 3, respectively. Then, unlike FIG. 12, the processor of the eNB 1 and the processor of the eNB 3 perform scheduling based on the interference restriction request received from the UE 1 and the UE 3, respectively. The processor of the eNB 1 and the processor of the eNB 3 collect the scheduling information received from several UEs (e.g., the UE 1 in case of the eNB 1 and the UE 3 in case of the eNB 3) belonging to the respective cells and then perform scheduling for restricting the use of the effective antennas and the beam pattern groups in consideration of the collected scheduling information, associated information, and traffic of the neighboring cell, etc. After performing scheduling, the eNB 1 and the eNB 3 may further include associated information including the interference level information of the neighboring eNB in addition to feedback information and transmit the associated information.

Thereafter, the processor of the eNB 2 may efficiently perform scheduling based on the received information. The processor of the eNB 2 performs scheduling based on the feedback information received by the receiver. After performing scheduling, for example, the transmitter of the eNB 2 may transmit a response signal "yes" indicating that the interference is restricted in response to the interference restriction request to the eNB 1, but may transmit a response signal "no" in response to the interference restriction request to the eNB 3. If the eNB 2 rejects the interference restriction request of the eNB 3, a proposal based on a second best plan may be transmitted. That is, the eNB 2 may transmit a response signal indicating that the effective antennas and the beam pattern groups will not be used in the subframes or subbands other than the specific subframes or subbands requested by the eNB 3.

Figure 14:
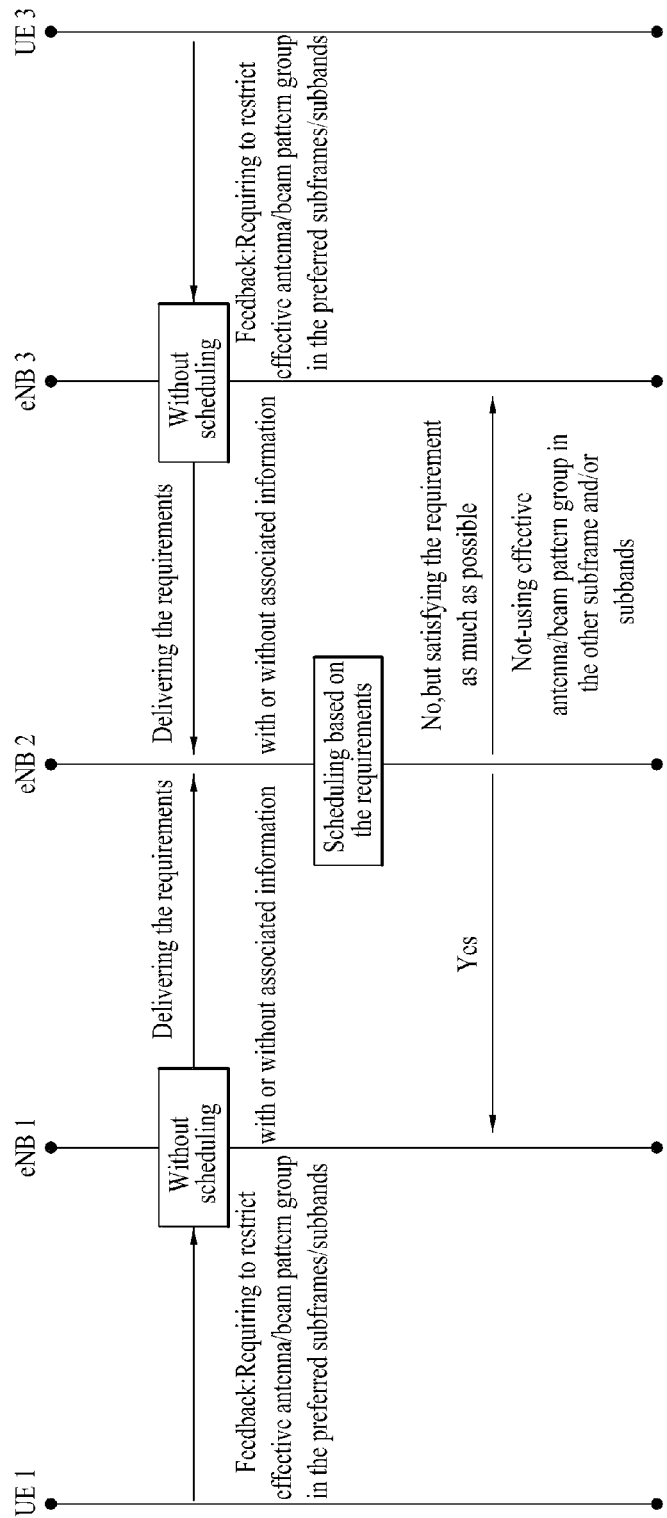
FIG. 14 is a diagram showing another example of a process of performing scheduling with respect to an interference restriction request and sharing scheduling information between eNBs, by an eNB 2 which is a neighboring eNB.

FIG. 14 is a diagram showing another example of a process of performing scheduling with respect to an interference restriction request and sharing scheduling information between eNBs, by an eNB 2 which is a neighboring eNB.

Referring to FIG. 14, a UE 1 and a UE 3 may perform scheduling and transmit the signals requesting restriction of the use of the specific effective antennas and the specific beam pattern groups in specific subframes or subbands to an eNB 1 and an eNB 3, respectively. Thereafter, the eNB 1 which is the serving eNB of the UE 1 and the eNB 3 which is the serving eNB of the UE 3 may transmit feedback information (information scheduled to restrict the use of the specific effective antennas and the specific beam pattern groups in the specific subframes or subbands) received from the UE 1 and the UE 3 to the eNB 2 which is the neighboring eNB without processing, respectively. The processor of the eNB 2 may efficiently perform scheduling based on the interference restriction request received from the eNB 1 and the eNB 3. After performing scheduling, for example, the transmitter of the eNB 2 may transmit a response signal "yes" indicating that the interference is restricted in response to the interference restriction request to the eNB 1, but may transmit a response signal "no" in response to the interference restriction request to the eNB 3. If the eNB 2 rejects the interference restriction request of the eNB 3, a proposal based on a second best plan may be transmitted. That is, the eNB 2 may transmit a response signal indicating that the effective antennas and the beam pattern groups will not be used in the subframes or subbands other than the specific subframes or subbands requested by the eNB 3.

In the above description, interference restriction (or silencing) for restricting the effective antennas/beam pattern groups of the neighboring cells having specific directivity to the serving cell was described. However, the inter-cell interference restriction method according to the present invention is applicable to the JP method among multiple cells. If multiple cells independently transmit data without sharing the data, effective antennas and beam patterns having directivity to a serving cell cause interference. However, in the JP method of enhancing the signal by sharing data among multiple cells, effective antennas and beam patterns having directivity to a serving cell may be the best PMI groups. Accordingly, an interference restriction (or silencing) technology restricting the effective antennas and the beam pattern groups of the neighboring cells is applicable to the JP technology of enhancing the signal of a UE located at a cell edge by sharing data among multiple cells.

In the present invention, the UE 500 feeds back N (N>1)-bit interference restriction indication information in a state in which interference is caused by neighboring cells so as to request the interference restriction (or silencing) to N neighboring cells. In the above-described invention, the UE transmits 1-bit interference restriction indication information to each of the neighboring cells which cause interference. In the UE 500 subjected to interference caused by the neighboring cells, in addition to the method of requesting the restriction of the use of the effective antennas, the interference level measuring module 541 may measure the interference of each of the antennas of the neighboring cells, the interference restriction request determination module 542 may determine an antenna subjected to great interference and the index of the antenna, the transmitter 580 may transmit a signal requesting interference restriction (or silencing) including the index information of the antenna to the serving eNB 800.

That is, the interference restriction request determination module 542 determines a predefined number of antenna indexes and may determine that an antenna index having interference exceeding a specific threshold is fed back. This method is applicable to the above-described UE-specific silencing method and cell-specific silencing method.

In order to completely eliminate the interference of the neighboring cells, in addition to the method of restricting the transmission of certain signals of the neighboring cells and the method of lowering the transmit power of the effective antennas to be equal to or less than a predetermined level by the neighboring eNBs in response to the silencing request, the processor 540 of the UE 500 may determine the transmit power of the effective antennas of the neighboring cells and feed back the transmit power. This value may be represented by quantized N (N>1) bits. The determination of the transmit power of the antennas of the neighboring cells by the UE 500 is applicable to a method of directly determining the indexes of the antennas of the neighboring cells which cause interference by the interference restriction request determination module 542 and feeding back the indexes by the transmitter 580, in addition to the indication of the effective antenna group. This method is applicable to the above-described UE-specific silencing method and cell-specific silencing method.

The aforementioned methods are applicable to CAS as well as DAS.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

MODE FOR THE INVENTION

Various embodiments have been described in the best mode for carrying out the invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Apparatus and method for controlling inter-cell interference in a wireless communication system in which a plurality of antennas is deployed in each cell are applied to communication standards such as 3GPP LTE, LTE-A, IEEE 802.16 and like that.

The invention claimed is:

1. A method for performing inter-cell interference coordination by a user equipment (UE) in a wireless communication system in which a plurality of antennas is deployed in each cell, the method comprising:

obtaining first information indicating a number of specific antennas from among a plurality of antennas of neighboring cells;

obtaining second information about indexes of the specific antennas;

obtaining third information about a reference signal of the neighboring cell;

measuring interference levels of the neighboring cells using the first information, the second information, and the third information;

comparing the interference levels of the neighboring cells with a predetermined threshold level and determining whether or not the UE requests an interference restriction to the neighboring cells; and transmitting information to a serving base station (BS) about one or more of the neighboring cells, to which the interference restriction request will be transmitted when the UE determines to request the interference restriction based on the compared interference levels, wherein the interference levels are transmitted to the neighboring cells by the serving BS.

2. The method according to claim 1, wherein the first information, the second information, and the third information are obtained from the serving BS.

3. The method according to claim 1, wherein the specific antennas cause interference to the user equipment.

4. The method according to claim 1, wherein the third information is received without the first and second information from the serving BS.

5. The method according to claim 4, wherein obtaining the first, second, and the third information comprises:

determining at least the number of the specific antennas or the indexes of the specific antennas using the third information.

6. The method according to claim 5, further comprising:

transmitting at least the first information or the second information to the serving BS.

7. A method for performing inter-cell interference coordination by a base station (BS) in a wireless communication system, the method comprising:

receiving a first message comprising first information, second information and third information from a neighbor cell, the first information indicating a level of interference experienced by the neighbor cell per predetermined subband unit, the second information related to silenced subframes in which transmission in the neighbor cell is restricted, and the third information indicating a number of specific antennas from among a plurality of antennas of the neighbor cell; and scheduling a downlink transmission or an uplink reception for a first user equipment (UE) served by the BS based on the first information, the second information, and the third information.

8. The method according to claim 7, further comprising:

receiving a second message from the neighbor cell or a second UE served in the neighbor cell, the second message requesting interference restriction; and turning off previously defined effective antennas that cause interference to one or more UE or turning off specific beam pattern groups that cause interference to one or more UE among beam antenna groups of the effective antennas, or restricting use of the previously defined effective antennas or the specific beam pattern groups in at least a specific time or frequency domain, wherein the requested interference restriction is determined by comparing channel states of the one or more UE with noise and comparing interference levels of cells excluding serving cells of the one or more UE with a predetermined threshold level.

9. The method according to claim 8, wherein the second message is received through a Physical Uplink Control Channel (PUCCH), a Physical Uplink Shared Channel (PUSCH) or higher layer signaling.

10. The method according to claim 7, wherein the first message further comprises fourth information related to interference caused by the neighbor cell per predetermined subband unit.

11. The method according to claim 7, wherein the first message is received via X2 interface signaling.

12. A base station (BS) performing inter-cell interference coordination in a wireless communication system, the base station comprising:
   an X2 interface module configured to receive a first message comprising first information, second information, and third information from a a neighbor cell, the first information indicating a level of interference experienced by the neighbor cell per predetermined subband unit, the second information related to silenced subframes in which transmission in the neighbor cell is restricted, and the third information indicating a number of specific antennas from among a plurality of antennas of the neighbor cell; and
   a processor configured to schedule a downlink transmission or an uplink reception for a user equipment (UE) served by the BS based on the first information, the second information, and the third information.

13. The BS according to claim 12, wherein the first message further comprises fourth information regarding interference caused by the neighbor cell per predetermined subband unit.

14. The BS according to claim 12, wherein the first message is received via X2 interface signaling.

* * * * *